(12) United States Patent
Winiar et al.

(10) Patent No.: US 8,656,984 B2
(45) Date of Patent: Feb. 25, 2014

(54) MOLD FOR DIRECT-CAST ALUMINOTHERMIC WELDING

(75) Inventors: Lionel Winiar, Ronchin (FR); Patrick Bommart, Rueil Malmaison (FR)

(73) Assignee: Railtech International, Raismes (FR)

( * ) Notice: Subject to any disclaimer, the term of this patent is extended or adjusted under 35 U.S.C. 154(b) by 0 days.

(21) Appl. No.: 12/743,517

(22) PCT Filed: Nov. 19, 2008

(86) PCT No.: PCT/EP2008/065851
§ 371 (c)(1),
(2), (4) Date: May 18, 2010

(87) PCT Pub. No.: WO2009/065864
PCT Pub. Date: May 28, 2009

(65) Prior Publication Data
US 2010/0276109 A1    Nov. 4, 2010

(30) Foreign Application Priority Data

Nov. 20, 2007   (FR) .................................... 07 59174

(51) Int. Cl.
*B22D 19/00*   (2006.01)
*B22D 19/04*   (2006.01)

(52) U.S. Cl.
USPC ............. 164/333; 164/332; 164/349; 164/53; 164/54; 228/234.3

(58) Field of Classification Search
USPC ................... 228/234.3; 164/53, 54, 333, 349
See application file for complete search history.

(56) References Cited

U.S. PATENT DOCUMENTS

| 3,091,825 A |   | 6/1963  | Deppeler, Jr. et al. |
|-------------|---|---------|----------------------|
| 3,113,359 A |   | 12/1963 | Burke                |
| 3,189,959 A |   | 6/1965  | Ahlert et al.        |
| 3,242,538 A |   | 3/1966  | Deppeler, Jr. et al. |
| 3,495,801 A |   | 2/1970  | Krüger               |
| 3,684,003 A |   | 8/1972  | Funk                 |
| 3,942,578 A | * | 3/1976  | Kachik et al. ................... 164/54 |

(Continued)

FOREIGN PATENT DOCUMENTS

| AT | 369304 | 8/2007 |
|----|--------|--------|
| AT | 373187 | 9/2007 |

(Continued)

OTHER PUBLICATIONS

English Computer Translation of DE 19819706 C1.*

*Primary Examiner* — Erin Saad
(74) *Attorney, Agent, or Firm* — Harness, Dickey & Pierce, P.L.C.

(57) ABSTRACT

The mold for aluminothermic welding of metal rails has two components made of identical rigid refractory material and suitable for fitting around two ends of rails to be welded, each component includes: a lower part having a face defining a mold cavity suitable for enveloping the foot and a core of the ends of the rails, and a channel opening at the bottom into a lower region of the mold cavity and having at the top an opening and an upper part including a cooling chamber connected to the mold cavity and capable of containing the heads of the rail ends, the cooling chamber forming a non-compartmentalized volume to which the channel is connected via the opening and which is bounded by an external wall of each mold component.

13 Claims, 4 Drawing Sheets

(56) References Cited

U.S. PATENT DOCUMENTS

| | | | |
|---|---|---|---|
| 4,190,228 A | 2/1980 | Bommart | |
| 4,205,721 A | 6/1980 | Jörn et al. | |
| 4,247,074 A | 1/1981 | Stratmann et al. | |
| 4,413,169 A | 11/1983 | Cameron | |
| 4,424,853 A | 1/1984 | Khandros et al. | |
| 4,429,207 A | 1/1984 | Devletian et al. | |
| 4,841,116 A | 6/1989 | Kimura et al. | |
| 4,881,677 A | 11/1989 | Amos et al. | |
| 5,151,202 A * | 9/1992 | Bommart | 249/86 |
| 5,175,405 A | 12/1992 | Karimine et al. | |
| 5,215,139 A | 6/1993 | Swartz et al. | |
| 5,419,484 A | 5/1995 | Radulescu | |
| 5,515,904 A * | 5/1996 | Radulescu | 164/54 |
| 5,531,259 A | 7/1996 | Kuster | |
| 5,605,283 A | 2/1997 | Lahnsteiner et al. | |
| 6,152,349 A | 11/2000 | Thuru | |
| 6,227,282 B1 | 5/2001 | Kuster et al. | |
| 6,793,003 B2 | 9/2004 | Triantopoulos et al. | |
| 7,546,923 B2 | 6/2009 | Abergel | |
| 7,641,168 B2 | 1/2010 | Delcroix | |
| 2009/0074231 A1 | 3/2009 | Rancien | |

FOREIGN PATENT DOCUMENTS

| | | |
|---|---|---|
| AU | 599274 | 7/1990 |
| CH | 223040 | 8/1942 |
| DE | 358525 | 9/1922 |
| DE | 495 777 | 4/1930 |
| DE | 548 528 | 4/1932 |
| DE | 198 19 706 | 10/1999 |
| DE | 19819706 C1 * | 10/1999 |
| EP | 0 407 240 | 1/1991 |
| EP | 0 802 013 | 10/1997 |
| FR | 1.146.153 | 11/1957 |
| FR | 2 374 127 | 7/1978 |
| FR | 2 396 620 | 2/1979 |
| FR | 2 819 274 | 7/2002 |
| FR | 2 890 665 | 3/2007 |
| FR | 2 890 668 | 3/2007 |
| JP | 03023089 B2 | 1/1991 |
| JP | 05245660 A | 9/1993 |
| JP | 08141756 A | 6/1996 |
| JP | 09182982 A | 7/1997 |
| WO | WO 2004/079233 | 9/2004 |
| WO | WO 2007/031528 | 3/2007 |

* cited by examiner

MOLD FOR DIRECT-CAST ALUMINOTHERMIC WELDING

CROSS-REFERENCE TO RELATED APPLICATIONS

This application is a National Phase Entry of International Application No. PCT/EP2008/065851, filed on Nov. 19, 2008, which claims priority to French Application 0759174, filed on Nov. 20, 2007, both of which are incorporated by reference herein.

BACKGROUND

The invention concerns a mold for aluminothermic welding of beams and/or metal rails longitudinally aligned with each other, which includes several components in a rigid refractory material capable of being temporarily assembled around two transverse beam/rail ends to be welded.

Document FR 2 890 668 describes such a mold whereof the components together define a mold cavity, opening upwardly, arranged to receive, by casting, a welding metal in liquid state and surrounding the two ends, an interval arranged between them and a first zone of each rail, immediately next to the corresponding end, to communicate a determined form to the welding metal during its solidification, as well as two continuous core prints arranged to bear against a second zone of each rail immediately next to the first zone thereof, opposite the corresponding end relative to said first zone. In particular, document FR 2 890 668 describes, in one embodiment, that the components, made of bonded sand to facilitate their destruction after a single use, are primarily three in number, made up of:

- two approximately identical upper halves of the mold, which constitute the specular image of each other relative to a median longitudinal plane common to the two rails to be assembled and which surround, from one respective side of these two rails, zones of the latter parts and of the interval formed between them which correspond to the top of the foot, the core, the bottom, the sides and the top of the head, and
- a lower or bottom component, having the general shape of a plate that completes the two upper parts below the foot of the rails and of the corresponding zone of the interval formed between them.

These three components are generally retained together, around rails to be assembled using a metal casing, itself reusable from one mold to the next. The mold cavity, open at the top, communicates in this direction, with a feed shaft whereof one upper end is partially obstructed using an attached stopper. Moreover, this upper end of the feed shaft leads into a pouring basin on which a crucible for aluminothermic welding is installed. Thus, when the welding metal in liquid state flows from the crucible, the jet of liquid welding metal crashes into the stopper partially obstructing the feed shaft then flows at reduced speed on either side of said stopper in the feed shaft to then gradually fill the mold cavity.

Although such a mold is satisfactory regarding the quality of the welding, it is far from optimal. Indeed, the mold, as previously described, only connects the liquid steel from the zone of the head with the liquid steel contained in the upper part of the channel via an opening disposed transversely (the resupply) whereof the reduced dimensions allow only a limited heat transfer from the channel toward the head; the heat reservoir constituted by the liquid steel being found in the upper part of the channel therefore only very slightly contributes to slowing the solidification speed of the welding in the zone of the head. Moreover, the stopper of the prior art serves to stop the jet, so that the latter does not directly hit the bottom component forming the bottom of the mold and thus accelerate its erosion. However, this has the major drawback of extending the filling time of the mold due to the decreased flow speed, which leads to greater heat losses and, in the end, to obtaining remelting of lesser quality of the rail ends due to convection of the liquid steel of the welding.

One aim of the invention is to provide a mold which, during use, makes it possible to obtain optimized and better quality welding. To that end, provided, according to the invention, is a mold for the aluminothermic welding of metal beams/rails including at least two essentially identical components in rigid refractory materials capable of being temporarily fitted opposite each other around two beam/rail ends to be welded, each of the components comprising:

- a first lower part having a face defining a mold cavity including, toward the top, an upper opening and arranged to receive, by casting, welding metal in liquid state, the face being able to surround the ends at the level of a foot and a core of said beams/rails, and a recovery channel for gas and welding metal in liquid state leading downward in a lower zone of the mold cavity and having an opening toward the top and
- a second upper part, adjacent and topping the first lower part, including a chamber communicating at the bottom with the upper opening of the mold cavity, open toward the top, arranged to receive, by casting, welding metal in liquid state and able to contain the ends at the level of a head of said beams/rails, the chamber being a slow cooling chamber forming a non-compartmentalized volume in which the opening of the channel leads and bounded by an external wall of each of the components of the mold and by a lower opening able to be situated under the head.

Thus, the fact that the chamber is a slow cooling chamber able to receive the head of the beams/rails to be welded and forming a non-compartmentalized volume bounded by the external walls of each of the components makes it possible, on one hand, for the jet of melt of welding metal in liquid state coming from the crucible to go directly and quickly into the mold cavity, reducing the heat losses as much as possible and therefore ensuring better remelting of the beam/rail ends to be welded during filling of the mold cavity, and, on the other hand, makes it possible to have a significant mass of welding metal in liquid state situated around the head making it possible to obtain slower cooling and therefore to increase the quality of the welding at the upper part of the beam/rail. Because of this, this chamber functions opposite the pouring basin of the prior art. Thus, relative to the prior art previously described, the elimination of any wall between the upper part of the channel and the zone of the head makes it possible for this zone to then benefit from the heat stored in the upper part of the channel and makes it possible to obtain slow solidification of the steel in that location.

Advantageously, but optionally, the mold of the invention presents at least one of the following features:

- the volume formed by the cooling chamber is a geometrically convex volume,
- the face is essentially concave and includes an edge able to come into contact with a zone of the beam/rail in order to seal the mold cavity to the welding metal in liquid state, at the level of the foot and the core,
- the cooling chamber has an opening bounded by a surface able to come into contact with a zone of the beam/rail in order to seal the cooling chamber to the welding metal in liquid state at the head, each component of the mold includes a third part, adjacent to and topping the second upper part, comprising a spill basin able to receive casting means of a crucible for aluminothermic welding and situated in an extension of the upper opening of the cooling chamber via communication means of the spill basin with said cooling chamber;

the mold includes a third component made of rigid refractory material intended to be placed below the foot at the ends of each beam/rail and including an upper face defining a bottom of the mold cavity, the upper face of the third component is essentially flat and is able to come into contact with a lower face of the foot, the rigid refractory material of the third component is more refractory than the refractory material of the first two components, the rigid refractory material of the third piece is made up primarily of alumina; and, the rigid refractory material is a bonded sand.

BRIEF DESCRIPTION OF DRAWINGS

Other features and advantages of the invention will appear upon reading the following description of one embodiment of a mold according to the invention. In the appended drawings.

DETAILED DESCRIPTION

Figure 1:
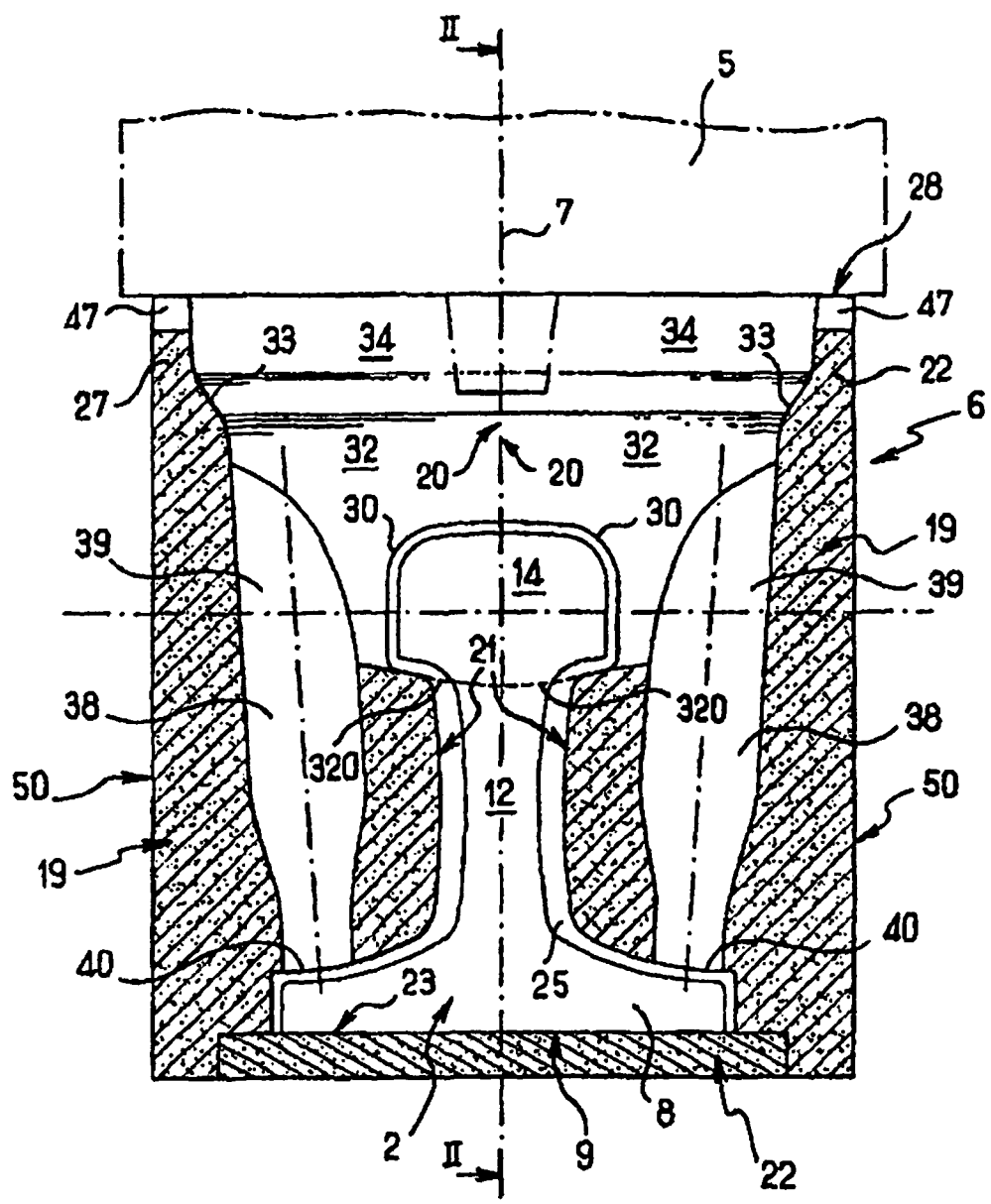
FIG. 1 is a view of a mold according to the invention including three components, the mold being seen in the assembled state on the ends of two railroad rails to be welded together and in cross-section relative to a transverse plane of symmetry between these two ends, as illustrated in I-I in FIG. 2.
Figure 2:
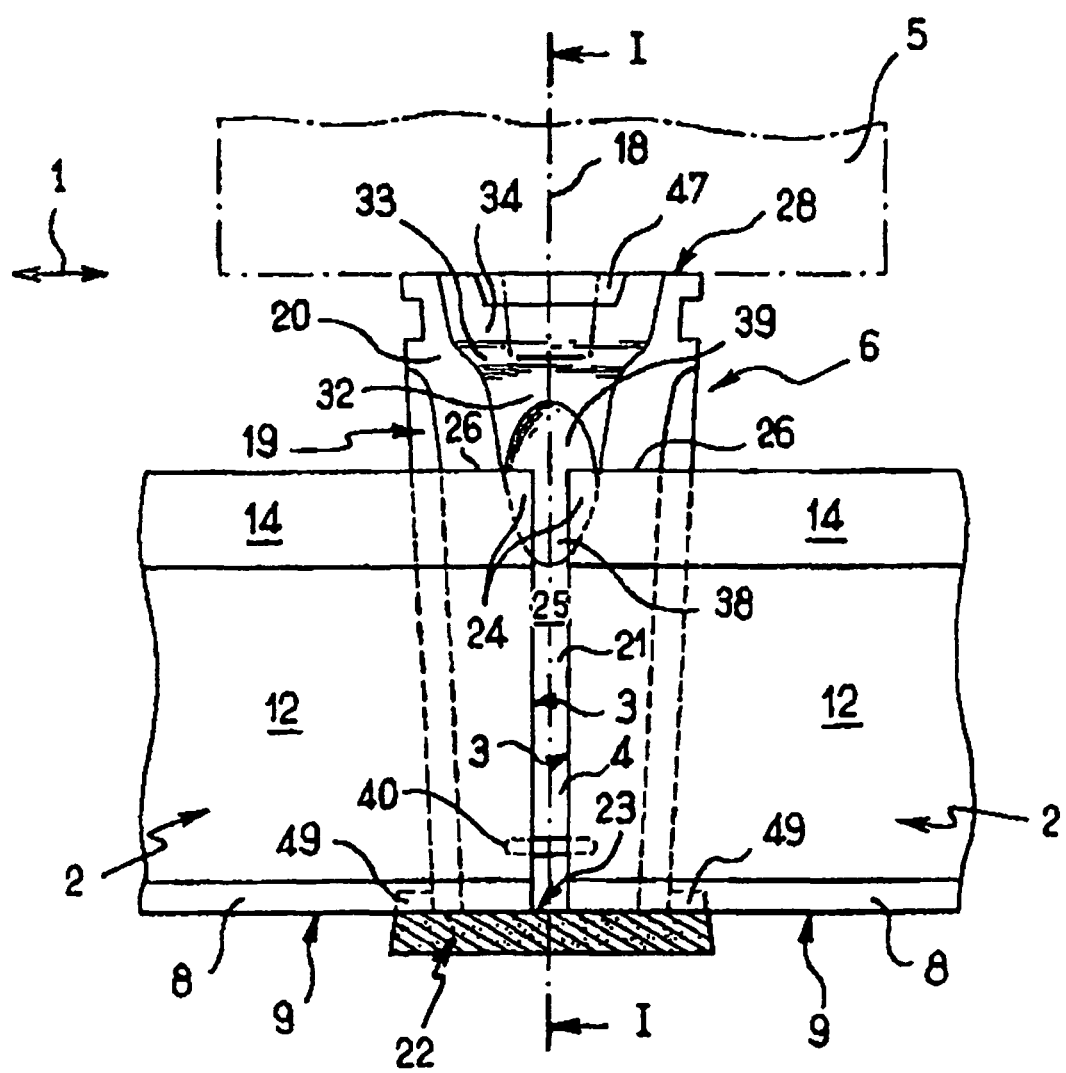
FIG. 2 is a view of the mold of FIG. 1 in cross-section by a longitudinal plane of symmetry common to the two rails, which are illustrated in elevation, and referenced II-II in FIG. 1.
Figure 3:
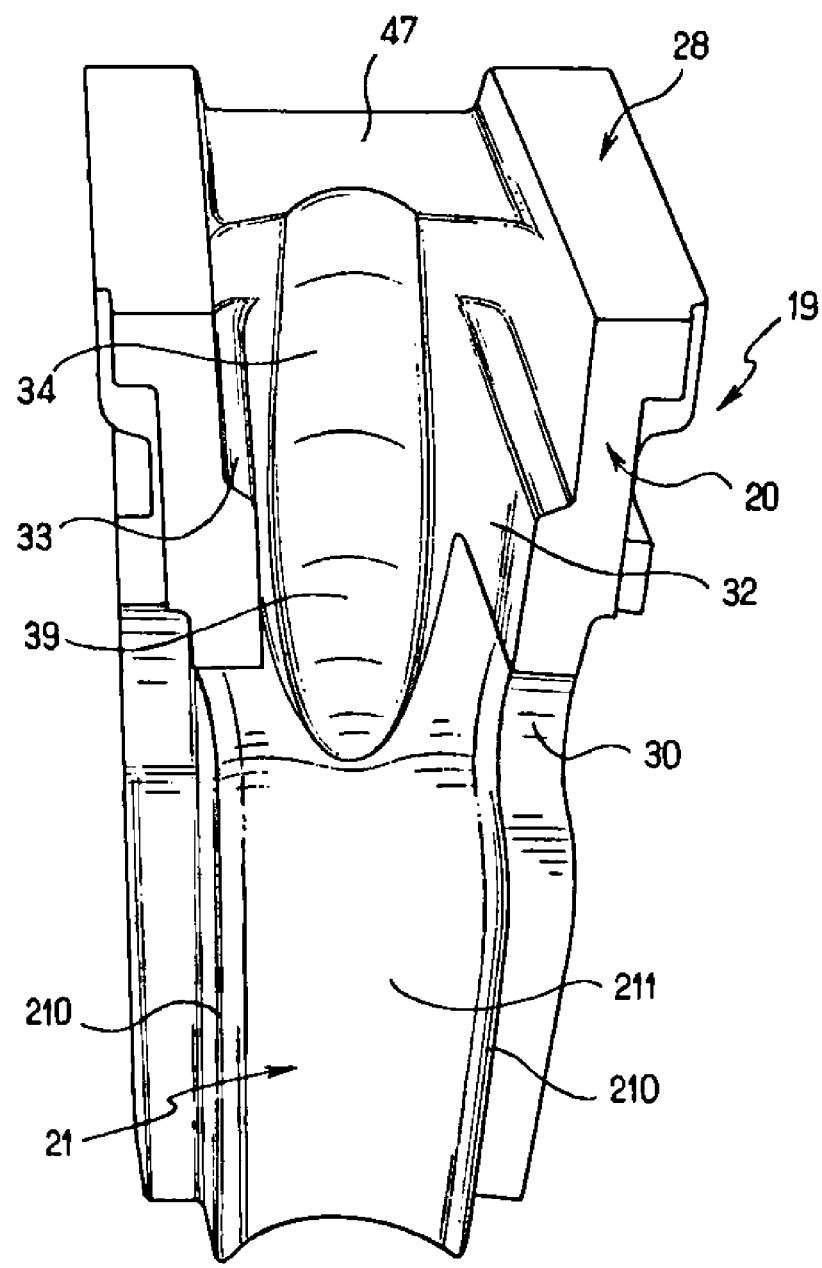
FIG. 3 is a three-dimensional view of one of the components of a mold according to the invention.
Figure 4:
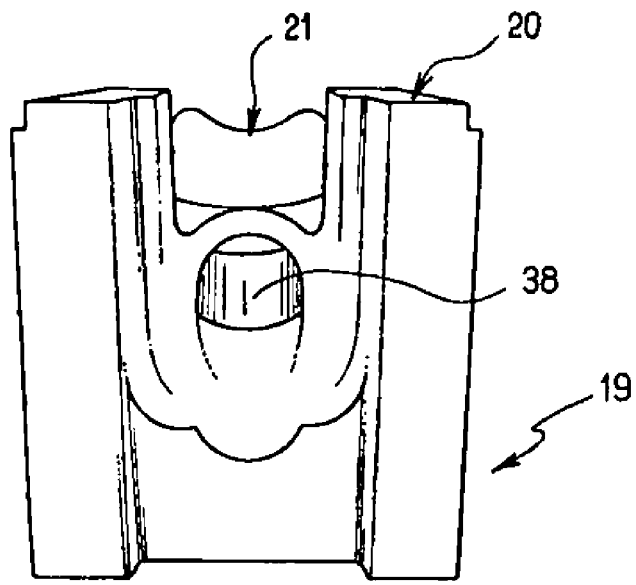
FIGS. 4 and 5 are top and side views of the component of the mold of FIG. 3.
Figure 5:
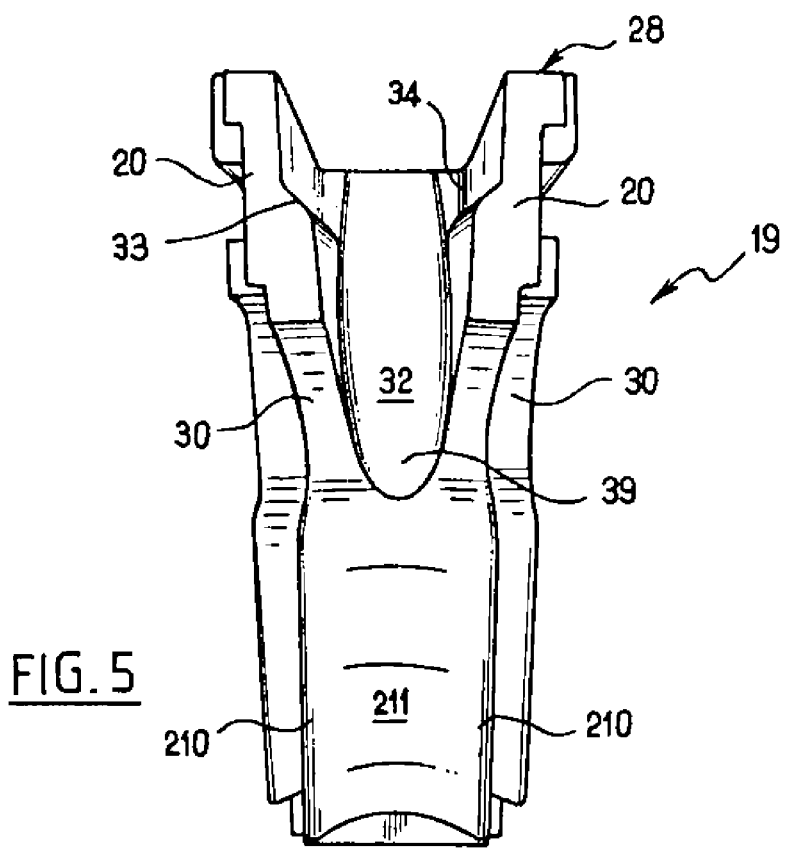

In the embodiment of a mold 6 according to the invention illustrated in the various appended figures, the described mold 6 is called upon to allow welding of two railroad rails 2. Considered here as a longitudinal direction, is a direction 1 according to which the two rails 2 assembled together by welding present themselves at least in the immediate vicinity of the ends 3 to be welded together, ends 3 which face each other to that end and which form, between them, a continuous interval 4, of determined longitudinal value (in the vicinity of 35 mm, for example), intended to be filled in by a welding metal provided in liquid state, by aluminothermic reaction inside a crucible 5 the nature of which is indifferent with regard to the invention, but which can for example be of the single use type, and placed directly on the mold 6 according to the invention, in a manner known in itself and described in European patent EP 0 407 240 to which one may refer for more ample information on this subject.

In the following description, the mold 6, according to the invention, is adapted to the mutual welding of rails 2 of the Vignoles type, having a respective symmetry relative to a longitudinal plane 7 that is combined with the cutting plane II-II, at least localized in the vicinity of the ends 3. It is of course possible to realize, according to the invention, mold intended for the welding of other types of rails (grooved or "Broca" type, double head, etc. . . . ), or to any type of beam, in particular and non-limitingly to IPN beams. Whatever the case may be, such a beam/rail includes three longitudinal parts, which can be symmetrical, respectively, relative to the plane 7 (as illustrated in the appended figures) and made in a single piece, i.e.:

of a flat foot 8 with an orientation generally perpendicular to the plane 7, bounded by a planar lower face or bottom 9 which perpendicularly cuts the plane 7, a flat core 12 situated along the plane 7, above the foot 8, and a head 14 of approximately rectangular section, oblong perpendicular to the plane 7.

The notions of top and bottom are used here in reference to a service position of the rails 2, in which the plane 7 has an approximately vertical orientation and constitutes the orientation in which the welding is done.

For their mutual welding, the ends 3 of rails 2 may be leveled, for example with cross cut saw, to be flat and perpendicular to the plane 7, and placed face to face, in a relationship of mutual parallelism and mutual symmetry relative to a transverse plane 18 which is combined with the cutting plane I-I, respecting the aforementioned interval 4, in which the welding metal in liquid state is cast, coming from the crucible 5, before letting this welding metal solidify to perform the welding. The mold 6 according to the invention serves to retain the metal thus cast when it is still in liquid state and to configure it in the desired manner during its solidification. For this, the mold 6 includes, illustrated here, three primary components, i.e. two upper components or halves 19, approximately identical, respectively approximately symmetrical relative to the plane 18 and mutually symmetrical relative to the plane 7, along which, at the level of one upper part of the upper components or halves 19, they are mutually joined by a respective planar face 20 above the head 14 of the rails 2 during placement of the mold 6 according to the invention around the latter parts, while each of them has, below this head 14, oriented primarily toward the plane 7, at the level of a lower of the upper components or halves 19 adjacent to the upper part, a respective face 21 configured to surround each of the two rails, in the vicinity of the ends 3, and the interval 4, in zones corresponding to the foot and the core of the rails intended to be welded, with the exception of the lower face 9 of the foot 8, respectively on either side of the plane 7, relative to which the faces 21 are mutually symmetrical. Between the face 20 and the face 21, each of the upper components or halves 19 includes an opening bounded by a surface 30 configured to surround each of the two rails, in the vicinity of the ends 3 in the zones corresponding to the head 14 of the rails 2 intended to be welded, respectively on either side of the plane 7, relative to which the surfaces 30 are mutually symmetrical.

Opposite the lower face 9 of the foot 8, the upper components or halves 19 are completed by a third component, or bottom component 22, having the general shape of a plate perpendicular to the plane 7 and bounded upwardly by an upper face 23 configured, in a manner that will be detailed later, so as to bear on the lower face 9 of the foot 8 of the two rails near the ends 3, as well as opposite the corresponding zone of the interval 4, and to connect, in the direction moving away from the plane 7, at the lower bound of each of the faces 21. This defines, with the latter parts, around the interval 4 and a respective zone 24 of each rail 2 at the level of the core 12 and the foot 9, directly adjacent to its end 3, a mold cavity 25 sealably closed to the welding metal in liquid state, by continuous bearing of an edge 211 bounding an essentially concave surface 210 of the faces 21, on one hand, and, on the other hand, of the face 23 against the two rails in a respective zone 26 of these rails 2 situated longitudinally opposite the end 3 relative to the aforementioned zone 24, thus housed inside the mold cavity 25.

Each of the components 19 and 22 also has an indifferent shape in light of the present invention, this shape for example fitting in a respective rectangle rhomb, but preferably defining, by a respective planar upper face 28 of each of the upper components or halves 19, perpendicular to the plane 18 and approximately perpendicular to the plane 7, an upper face of the mold 6, able to directly carry the crucible 5 according to the teachings of the aforementioned document EP 0 407 240, the two faces 28 form, between them, a dihedral with angle of a value different from 180° with the aim of self-centering of the crucible 5 configured complementarily. At the level of the upper part of each of the upper halves 19 of the mold 6, the latter is hollow, in its faces 20 and 28 as well as in the surface 30 opposite an upper face above the head 14 of the rails 2 and the corresponding zone of the interval 4, by a respective half of a cooling chamber 32 of the welding metal in liquid state, coming from the crucible 5, toward the mold cavity 25. Each of the halves of the cooling chamber being approximately symmetrical relative to the plane 18 and these two halves being mutually symmetrical relative to the plane 7, the cooling chamber 32 has an overall symmetry relative to an axis defined by the intersection of these planes 18 and 7, and thus leads along that axis, on one hand, upward in the upper face 28 and, on the other hand, downward in the mold cavity 25 via a respective upper 34 and lower 320 mouth corresponding to the upper opening of the mold cavity 25, both having the aforementioned axis. This lower mouth 320 is reflected here in FIG. 1 by a broken line.

Moreover, the cooling chamber 32 is bounded by an external wall 27 of each of the upper components or halves 19 of the mold 6. This wall 27 has a minimal thickness making it possible to maintain the integrity of the upper components or halves 19 during their manufacture, transport, use as well as during casting of welding metal in liquid state. In practice and for example, this thickness is in the vicinity of about 1 cm to 1.5 cm. This allows the cooling chamber 32 to have an optimized volume relative to the general shape of each of the upper components or halves 19 of the mold 6.

Furthermore, this volume is not compartmentalized, i.e. there is no wall made in refractory material which extends protruding inside the cooling chamber, or presence of obstacles in rigid refractory material such as a stopper as described in the prior art illustrated by document FR 2 890 668. Moreover, the cooling chamber 32, once the mold 6 is fitted around the two rails 2 intended to be welded, contains the upper part of the two rails formed by the head 14. Thus, once the welding metal in liquid state is cast in the mold 6, there is a significant mass of this metal around the head filling the cooling chamber 32.

This significant mass will allow, following the casting, slow cooling making it possible to obtain optimized welding in quality at the level of the upper part or head 14 of the two rails thus welded. Moreover, the slowness of the cooling in this zone therefore also makes it possible on one hand to improve the steel owing to longer decanting of the steel and on the other hand only to solidify at the head after the zone of the core is solidified, thereby avoiding the formation of shrinkage cavities at the core.

In one alternative embodiment, for the volume formed by the cooling chamber 32 to be maximal in the general shape of the mold 6, the volume formed by said cooling chamber 32 is mathematically or geometrically a convex volume. It is understood in geometry that a volume is convex if for all pairs of points (A, B) of that volume, the segment [AB] joining them is entirely contained in the volume.

In one alternative embodiment, each of the upper components or halves 19 has a third part adjacently topping the upper part of the upper components or half 19 in which the cooling chamber 22 is hollowed out. This third part includes a spill basin 34 which has a lower opening 33 leading into the upper part of the cooling chamber 32. Thus a volume formed by the spill basin 34 is found in the extension of that formed by the cooling chamber 32. This opening 33 forms means for connecting the spill basin 34 with the cooling chamber 32. The spill basin 34 therefore extends from the upper face 28 to the upper opening of the cooling chamber 32. Moreover, the spill basin 34 has openings 47 formed through the wall 27 in the vicinity of the upper face 28. Each of the upper components or halves 19 includes, here, an opening 47 realized in the wall 27 symmetrically relative to the plane 18 and upwardly open at the upper face 28. These openings 47 allow the evacuation of gases during casting of the welding metal in liquid state in the mold, as well as the evacuation of the corundum when the casting is done, corundum resulting from the aluminothermic reaction within the crucible 5. The spill basin 34, during use of the mold 6 with a crucible 5, receives casting means from the crucible 5 by which the welding metal in liquid state flows in the form of a jet in the cooling chamber 32.

The lower part of each of the upper components or halves 19, in addition to including the face 21 bounding the mold cavity 25, comprises a cylindrical channel 38. In particular, the channel 38 is circular cylindrical. It extends essentially vertically in a thickness of rigid refractory material situated between the face 21 and an external face 50 of the lower part of each of the upper components or halves 19. The main axis of the channel 38 is essentially in the plane 18. The channel 38 has, in its lower part, a mouth 40 which opens into the lower zone of the mold cavity 25 above the foot 7 of each of the rails intended to be welded once the mold is fitted around these rails.

Moreover, at another opposite end of the channel 38, the latter part has an upper opening 39 which connects the channel 38 directly with the cooling chamber 32 of the upper part of each of the upper components or halves 19 of the mold 6. This opening 39 is situated at the level of a connection between the core 12 and the head 14 of the rails and extends essentially parallel to and opposite the sides of said head.

Concerning the third component 22 of the mold 6 according to the invention, this component 22 is generally rectangular rhomb-shaped and has an upper face 23 which is, here, essentially planar. During placement of the mold on the rails 2 intended to be welded, the upper face 23 of the component 22 bears on the lower face 9 itself also essentially planar here, of the foot 8 of each of the rails intended to be welded. More generally, the upper face 23 of the foot 9 is complementary to the lower face 9 of the foot 8 with which it is designed to cooperate. Such a configuration makes it possible not to obtain, during solidification of the welding metal introduced into the mold cavity 25, a bead protruding toward the bottom of the face 9 of the foot 8. Such a possibility makes it possible to avoid the problems of fatigue due to the presence of these beads according to the prior art when the rails are intended to bear, during their use, on a continuous footing. This is made possible by the configuration of the mold 6 according to the invention which allows the welding metal in liquid state to arrive, from the crucible 5, directly and quickly in the lower part of the casting cavity 25, at the feet 8 of the rails 2 intended to be welded, during casting. Alternatively, the upper face is essentially concave or has a complex surface.

Indeed, this quick and direct arrival best reduces the thermal losses of the welding metal in liquid state. Thus the welding metal in liquid state, once in the bottom of the mold cavity 25, has a sufficient temperature to optimally remelt the rail ends at the level of the foot, which makes it possible to improve the quality of the welding at the level of said foot and to free oneself from the extra mass represented by the bead obtained with the molds of the prior art. Alternatively, moreover, to avoid erosion of the third component 22 under the effect of the direct jet of cast welding metal in liquid state, this third component 22 is made in a rigid refractory material which is more refractory than the rigid refractory material constituting the upper components or halves 19. In particular, the rigid refractory material of the third component 22 is made up primarily of alumina, the content of which is between about 90 and 100%. The rigid refractory material of the upper components or halves 19 is a bonded sand. Moreover, the third component 22 also extending from the face 23 has protuberances 49 to facilitate the mutual positioning of the three components 19 and 22 by interlocking around the upper components or halves 19, respectively on either side of each in the direction moving away relative to the plane 18.

In practice, the mold 6 according to the invention has smaller dimensions relative to the molds of the prior art, in particular molds as described in document FR 2 890 668. This makes it possible to use less rigid refractory material to realize the mold and, during use for the welding of two rails, it is possible to use less aluminothermic mixture to carry out the casting while preserving optimal quality for the welding. Thus, a mold according to the invention produces less waste when it is intended for single use. Indeed, it has been observed that between a mold of the prior art and a mold according to the invention, both intended to carry out the same type of welding, the mold according to the invention has a weight about 30% less than the mold according to the prior art, while the mass of the aluminothermic mixture can be reduced by about 10%.

Lastly, the mold according to the invention is usable, without consequences on its implementation and on the quality of the welding obtained, in situations where the two rails to be welded are inclined, as can occur in curves for railroad tracks. Indeed, the power of the jet coming out of the casting means of the crucible is such that this jet is deviated completely imperceptibly under the effect of gravity when this jet reaches the third component of the bottom of the mold according to the invention. In the case of realization of railroad tracks, this incline can reach about 10%. Of course, it is possible to make a number of modifications to the invention without going beyond the scope thereof.

The invention claimed is:

1. A mold for aluminothermic welding of metal beams or rails including at least two essentially identical components in rigid refractory material and able to be temporarily fitted opposite each other around two beam or rail ends to be welded, each of the components comprising:
   a lower part including a face defining a mold cavity including, toward a top, an upper opening and arranged to receive, by casting, welding metal in liquid state, the face being able to surround the ends at least at a level of a foot and a core of the beams or rails, and a recovery channel for gas and welding metal in liquid state leading downward in a lower zone of the mold cavity and having, toward the top, an opening; and
   an upper part, adjacent and topping the lower part, including a chamber downwardly communicating with the upper opening of the mold cavity and open toward the top, arranged to receive, by casting, welding metal in liquid state and able to contain the ends at a level of a head of the beams or rails;
   wherein the chamber is a slow cooling chamber forming a non-compartmentalized volume arranged such that the welding metal in liquid state flows directly from a crucible to the mold cavity along a vertical direction without obstruction, in which the opening of the recovery channel leads, and bounded by an external wall of each of the components of the mold and by a lower opening able to be situated under the head;
   the recovery channel being located in the vertical direction and without obstruction, directly below a portion of the slow cooling chamber where the opening of the recovery channel is located, and directly above a portion of the lower zone of the mold cavity.

2. The mold according to claim 1, wherein the welding metal flows from the slow cooling chamber to the recovery channel and between the foot.

3. The mold according to claim 1, wherein the welding metal solidifies adjacent the head after solidification adjacent the core.

4. The mold according to claim 1, wherein the recovery channel, directly below the slow cooling chamber, has a larger cross-sectional area than directly above a portion of the lower zone of the mold cavity.

5. The mold according to claim 1, wherein the volume forming the cooling chamber is a geometrically convex volume.

6. The mold according to claim 1, wherein the face is essentially concave and includes an edge able to come into contact with a zone of the beam or rail in order to seal the mold cavity to the welding metal in liquid state, at the level of the foot and the core.

7. The mold according to claim 1, wherein the slow cooling chamber has an opening bounded by a surface able to come into contact with a zone of the beam or rail in order to seal the cooling chamber the mold cavity to the welding metal in liquid state, at the level of the head.

8. The mold according to claim 1, wherein each of the components also includes a third part, adjacent to and topping the upper part, comprising a spill basin able to receive a crucible for aluminothermic welding and situated in an extension of the upper opening of the cooling chamber via a connector connecting the spill basin with the cooling chamber.

9. The mold according to claim 1, further comprising a third component in rigid refractory material intended to be placed below the foot at the level of the ends of each beam or rail and including an upper face bounding a bottom of the mold cavity.

10. The mold according to claim 9, wherein the upper face of the third component is essentially planar and can come into contact with a lower face of the foot.

11. The mold according to claim 9, the rigid refractory material of the third component is more refractory than the rigid refractory material of the two components.

12. The mold according to claim 9, wherein the rigid refractory material of the third component is made up primarily of alumina.

13. The mold according to claim 1, wherein the rigid refractory material is a bonded sand.

* * * * *